US011605250B2

(12) United States Patent
Mallela et al.

(10) Patent No.: US 11,605,250 B2
(45) Date of Patent: Mar. 14, 2023

(54) MOTOR VEHICLE WIRELESS DATA COMMUNICATION SYSTEM

(71) Applicant: International Engine Intellectual Property Company, LLC, Lisle, IL (US)

(72) Inventors: Srinivas Murthy Mallela, Aurora, IL (US); Lisa Marie Angara, West Chicago, IL (US); Jack David Nimz, Glenview, IL (US); Daniel Teshin Kang, Elk Grove Village, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 17/554,824

(22) Filed: Dec. 17, 2021

(65) Prior Publication Data

US 2022/0139125 A1 May 5, 2022

Related U.S. Application Data

(63) Continuation of application No. 15/879,876, filed on Jan. 25, 2018, now Pat. No. 11,238,672.

(51) Int. Cl.
*G07C 5/00* (2006.01)
*G08G 1/0967* (2006.01)
(Continued)

(52) U.S. Cl.
CPC .............. *G07C 5/008* (2013.01); *G01M 15/00* (2013.01); *G07C 5/0841* (2013.01); *G08G 1/096708* (2013.01); *G08G 1/096775* (2013.01)

(58) Field of Classification Search
CPC .............. G07C 5/008; G08G 1/096708; G08G 1/096775
(Continued)

(56) References Cited

U.S. PATENT DOCUMENTS 6,356,822 B1    3/2002  Diaz
6,477,452 B2 *  11/2002 Good ...................... G08G 1/20
                                                        340/901

(Continued)

FOREIGN PATENT DOCUMENTS

CA              2491116 C    *  3/2010   .............. G01G 19/02
WO     WO-2004092876 A2    * 10/2004   .......... G01C 21/3415

OTHER PUBLICATIONS

Ma et al., "Study of Vehicle Weight-in-Motion System Based on Fiber-Optic Microbend Sensor," 2010, vol. 3, Publisher: IEEE.*
Martin et al., "Sensors utilization for weighing applications of vehicles in motion," 2014, Publisher: IEEE.*

*Primary Examiner* — Tuan C To
(74) *Attorney, Agent, or Firm* — Mark C. Bach

(57) ABSTRACT

A system for use with a vehicle includes at least one device installed or present onboard the vehicle and configured to sense or determine at least one condition or characteristic of the vehicle or its driver. The at least one device communicates the condition or characteristic with a remote site or web service using a wireless communication device. The remote site or web service correlates or compares the condition or characteristic of the vehicle or its driver with road conditions, capacities, facilities, and/or established safety data associated with the upcoming roadway, and determines whether the vehicle should stop or enter a facility due to an incompatibility or conflict between the condition or characteristic and the road conditions, capacities, facilities, and/or established safety data. The remote site or web service then communicates the determination of whether the (Continued)

vehicle should stop or enter the facility to the device on the vehicle.

20 Claims, 2 Drawing Sheets

(51) Int. Cl.
*G07C 5/08* (2006.01)
*G01M 15/00* (2006.01)

(58) Field of Classification Search
USPC .......................................................... 701/117
See application file for complete search history.

(56) References Cited

U.S. PATENT DOCUMENTS

| | | | |
|---|---|---|---|
| 6,980,093 B2* | 12/2005 | Oursler | G08G 1/02 |
| | | | 705/13 |
| 10,634,547 B1* | 4/2020 | Honig | G06Q 50/18 |
| 10,732,025 B2* | 8/2020 | Jones | G01G 19/42 |
| 11,238,672 B2* | 2/2022 | Mallela | G07C 5/0841 |
| 2004/0021579 A1* | 2/2004 | Oursler | G08G 1/02 |
| | | | 340/870.07 |
| 2005/0065711 A1* | 3/2005 | Dahlgren | G08G 1/096775 |
| | | | 701/117 |
| 2018/0058911 A1* | 3/2018 | Jones | G01G 19/414 |
| 2019/0066401 A1* | 2/2019 | Seaman | G06Q 10/08 |

* cited by examiner

MOTOR VEHICLE WIRELESS DATA COMMUNICATION SYSTEM

CROSS-REFERENCE TO RELATED APPLICATIONS

This application is a continuation claiming the benefit of priority to co-pending U.S. patent application Ser. No. 15/879,876 filed Jan. 25, 2018. And, the aforementioned patent application is herein incorporated by reference in its entirety.

BACKGROUND

Embodiments described herein generally relate to a system and method for determining the weight and/or other condition or characteristic of a vehicle using one or more devices on the vehicle, wirelessly communicating the vehicle weight and/or other vehicle condition or characteristic, possibly in response to a remote prompt and/or predetermined threshold, and correlating to and/or taking action based upon the vehicle weight and/or other vehicle condition or characteristic information, and further based upon upcoming road conditions, capacities, and/or facilities.

RELATED ART

Vehicles, particularly road going Commercial Motor Vehicles (CMV), are subject to total weight limitations and/or axle weight limitations that are enacted to protect the roadways and structures over which they travel. In order to enforce the total weight limitations and/or axle weight limitations, governmental and/or regulatory entities build and operate weigh stations, wherein CMV's and other weight regulated vehicles pass over a scale, which may be a "Weigh in Motion" (WIM) scale. The WIM scale or similar sensors may determine the approximate axle weights of a CMV as the vehicle moves across these sensors, and may calculate the gross vehicle weight and classification based on the number of axles, as well as axle weights and spacings. Typically, vehicles subject to such regulation must exit from the main roadway, stop or slow down to be weighed, receive direction as to whether the vehicle may proceed or must stop, and then re-enter traffic flow on the main roadway. Such weigh stations, therefore, represent a financial burden upon the governmental or regulatory entity to build and operate. They further delay such regulated vehicles, which adds to the overall cost of goods transportation.

Furthermore, such weigh stations are often limited in capacity, so that a maximum queue length is provided for, and when the queue reaches the maximum length provided, additional incoming vehicles are allowed to bypass the weigh station. Additionally, pursuit vehicles and enforcement personnel are often required, in order to prevent drivers from simply bypassing the weigh station, queue length notwithstanding. Some CMV operators may attempt to circumvent weight limitation enforcement by taking bypass routes around such weigh stations. In order to combat this, it is known to use portable or temporary weigh stations in addition to fixed weigh stations, and to place these portable or temporary weigh stations on known bypass routes. It is further known that the fixed weigh station and/or the portable or temporary weigh stations may be unstaffed, and may rely upon remote monitoring of vehicle weight, compliance, and other information gathered by the fixed, portable, or temporary weigh station.

It is further known to utilize information obtained from vehicle onboard sensors to calculate or derive vehicle overall or individual axle weight, and to relay this information via short range wireless communications to the fixed, portable, or temporary weigh station. The vehicle onboard sensors used to calculate or derive vehicle overall or individual axle weight may include suspension air bag pressure sensors, and/or vehicle tire pressure sensors. It is further known to obtain additional information from vehicles passing through weigh stations, including vehicle and/or license plate identification, vehicle status, vehicle and/or driver permit information, driver credentials, driver history, driver hours of service, height, width, and length, by way of short range wireless communication from the vehicle to the fixed, portable, or temporary weigh station.

However, drivers and operators of CMV's are highly incentivized to maximize their revenue producing payloads and/or to avoid the delays imposed by fixed, portable, or temporary weigh stations. Therefore, drivers may quickly learn and communicate to one another the location of not only the fixed, but also the portable or temporary weigh stations, and thereby find new bypass routes. Furthermore, in so doing, drivers and operators may increasingly operate their CMV's over routes and structures that lack sufficient load bearing capacity and/or traffic capacity. Additionally, drivers and operators of CMV's may find ways to defeat or only temporarily comply with the limits being enforced. For example, a driver may lower one or more tag or pusher axles upon approach to a known fixed, temporary, or portable weigh station, in order to comply with axle load limits. The driver may then raise the one or more tag or pusher axles after passing through or over the weigh station, in order to conserve fuel. Similarly, drivers and/or operators may find other ways to defeat or temporarily comply with other measured compliance information.

Furthermore, even a CMV that properly passes through a fixed, portable, or temporary weigh station may not long remain upon the route that is designed to handle the weight, or other characteristic, of that CMV, and may not in fact have been long upon the route that is designed to handle the weight, or other characteristic, of that CMV before passing through the fixed, portable, or temporary weigh station. Additionally, the capability and/or capacity of the route ahead of the CMV to handle the weight, or other characteristic, of that CMV may be changeable. As a non-limiting example, the weight bearing capacity of the roadway or roadway structures may be reduced due to temperature or due to construction. Similarly, the route ahead may have slopes, grades, or other terrain that are more treacherous for loaded vehicles during the winter season than during the summer, spring, or fall seasons. The weather conditions may in other respects alter the capability and/or capacity of the route ahead of the CMV to handle the weight, or other characteristic, of that CMV.

Drivers and/or operators of CMV's are also highly incentivized to ignore or circumvent other compliance issues, such as emissions requirements, permitting, hours of service, or engine or transmission faults, or brake adjustments, as non-limiting examples. A driver and/or operator may simply ignore a malfunction indicator light (MIL) or other inconsequential notification until forced to service the vehicle. As a result, the driver and/or the CMV may have an issue which may pose a safety risk to the driver, the CMV, other vehicles sharing the road with the vehicle, and/or the environment or infrastructure.

Accordingly, there is an unmet need for a system and method for determining the weight and/or other condition or characteristic of a vehicle without relying upon the vehicle to pass through or over a fixed, portable, or temporary weigh station, communicating the vehicle weight and/or other vehicle condition or characteristic, and correlating to and/or taking action based upon the vehicle weight and/or other vehicle condition or characteristic information, and further based upon upcoming road conditions, capacities, and/or facilities on the route ahead of the vehicle.

SUMMARY

According to one embodiment of the system and method, a system for use with a vehicle includes at least one device installed or present onboard the vehicle and configured to sense or determine at least one condition or characteristic of the vehicle or its driver. At least one wireless device is connected to the at least one device installed or present onboard the vehicle. The at least one device installed or present onboard the vehicle is configured to communicate the at least one condition or characteristic of the vehicle or its driver with at least one remote site or web service by way of the at least one wireless communication device. The at least one remote site or web service is configured to correlate or compare the at least one condition or characteristic of the vehicle or its driver with a road condition, a capacity, a facility, and/or established safety data associated with the upcoming roadway. The at least one remote site or web service is further configured to send a signal to the at least one device installed or present onboard the vehicle upon determining that there is at least one incompatibility or conflict between the condition or characteristic of the vehicle or its driver and the road condition, capacity, facility, and/or established safety data associated with the upcoming roadway requiring corrective action.

According to another embodiment of the system and method, a vehicle has a system including at least one device installed or present onboard the vehicle and configured to sense or determine at least one condition or characteristic of the vehicle or its driver. At least one wireless device is connected to the at least one device installed or present onboard the vehicle. The at least one device installed or present onboard the vehicle is configured to communicate the at least one condition or characteristic of the vehicle or its driver with at least one remote site or web service by way of the at least one wireless communication device. The at least one remote site or web service is configured to correlate or compare the at least one condition or characteristic of the vehicle or its driver with a road condition, a capacity, a facility, and/or established safety data associated with the upcoming roadway. The at least one remote site or web service is further configured to send a signal to the at least one device installed or present onboard the vehicle upon determining that there is at least one incompatibility or conflict between the at least one condition or characteristic of the vehicle or its driver and the road condition, capacity, facility, and/or established safety data associated with the upcoming roadway requiring corrective action.

According to another embodiment of the system and method, a method of determining the action of a vehicle based on conditions or characteristics of the vehicle or its driver, in view of conditions or characteristics associated with the upcoming roadway includes several steps. The first step is sensing or determining at least one condition or characteristic of the vehicle or its driver using at least one device that is installed or present onboard the vehicle and that is connected to at least one wireless device. The second step is communicating the at least one condition or characteristic of the vehicle or its driver from the at least one device installed or present onboard the vehicle to at least one remote site or web service by way of the at least one wireless communication device. The third step is correlating or comparing the at least one condition or characteristic of the vehicle or its driver with at least one of a road condition, a capacity, a facility, and established safety data associated with the upcoming roadway. The fourth step is determining whether the vehicle requires corrective action due to at least one incompatibility or conflict between the at least one condition or characteristic of the vehicle or its driver, and the road condition, capacity, facility, or established safety data associated with the upcoming roadway. The fifth step is communicating the determination of whether the vehicle requires corrective action from the at least one remote site or web service to the at least one device installed or present onboard the vehicle.

DETAILED DESCRIPTION

Figure 1:
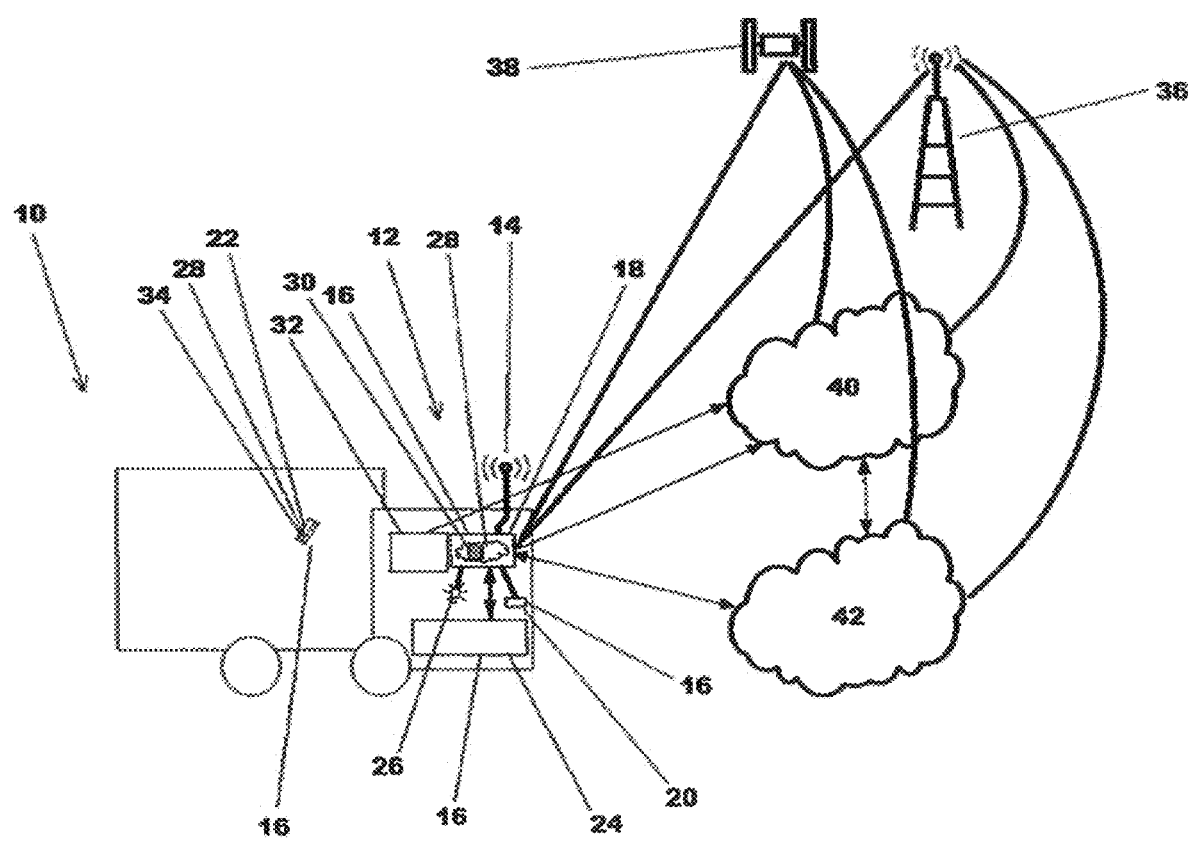
FIG. 1 is a schematic view of a vehicle having an embodiment of a system and method for determining the weight and/or other condition or characteristic of a vehicle using one or more devices on the vehicle, wirelessly communicating the vehicle weight and/or other vehicle condition or characteristic in response to a remote prompt and/or predetermined threshold, and correlating to and/or taking action based upon the vehicle weight and/or other vehicle condition or characteristic information, and further based upon upcoming road conditions, capacities, and/or facilities, as described herein.

Embodiments described herein relate to such a system and method for determining the weight and/or other condition or characteristic of a vehicle using one or more devices installed or present on the vehicle, wirelessly communicating the vehicle weight and/or other vehicle condition or characteristic in response to a remote prompt and/or predetermined threshold, and correlating to and/or taking action based upon the vehicle weight and/or other vehicle condition or characteristic information, and further based upon upcoming road conditions, capacities, and/or facilities, and/or established safety data associated with the upcoming roadway. The system and method described herein may be applied to over-the-road Commercial Motor Vehicles (CMV) and other vehicles subject to overall vehicle weight, axle weight, and/or other vehicle condition or characteristic limitations, as a non-limiting example.

A non-limiting exemplary embodiment of the system and method communicates information by way of wireless communications from a CMV to a remote site or company web service, and/or to a site or web service of a weigh station or other service or inspection facility. The information communicated may include at least one of overall vehicle weight, individual axle weight, tire pressure, vehicle identification, vehicle status, vehicle and/or driver permit information, driver credentials, driver history, driver hours of service, driver intoxication, quantity of fuel, quantity of reductant, brake air pressure, quantity of brake fluid, brake system function and/or record of inspection and/or adjustment, J1939 or other vehicle controller area network (CAN) bus diagnostic information, engine and/or transmission faults, exhaust particulate and/or pollutant level, vehicle height, vehicle width, and/or vehicle length, as non-limiting examples. The information wirelessly communicated by the CMV to the remote site or company web service, and/or to the site or web service of the weigh station or other service or inspection facility, is then correlated and/or compared to upcoming road conditions, capacities, and/or facilities, and/or established safety data associated with the upcoming roadway. Such upcoming road conditions, capacities, and/or facilities, and/or established safety data may include the weight bearing capacity of the roadway or roadway structures ahead, upcoming slopes, grades, or other terrain, weather conditions, and/or dimensional limitations imposed by normal roadway constraints or by construction, as non-limiting examples.

The system and method then determines whether the CMV may continue along its route, or if the CMV or the remote site needs to be notified that corrective action is required, or whether the CMV needs to stop or be stopped, or limited in one or more of its operational capabilities (e.g. speed, turn angle, weight, and etcetera), due to one or more incompatibilities or conflicts between the information wirelessly communicated by the CMV, and the upcoming road conditions, capacities, facilities, and/or established safety data associated with the upcoming roadway. This determination may be made at least in part by the remote site or company web service, and/or by the site or web service of the weigh station or other service or inspection facility, and/or onboard the CMV. If the CMV needs to stop or be stopped, or requires other corrective action, the remote site or company web service or the site or web service of the weigh station or other service or inspection facility may, for example, communicate wirelessly with one or more devices installed or present onboard the CMV, which may include a vehicle telematics device, an Engine Control Unit (ECU), an Electronic Driver Logging (EDL) device, a handheld device, and/or a pass/stop device.

The one or more devices installed or present onboard the CMV may then direct the CMV to a regular fixed weigh station or other service or inspection facility for inspection, or may put the CMV out of service or in a limp-home mode, or may disable one or more vehicle functions, until the vehicle is brought into conformance with the necessary requirements or appropriate corrective action is taken. If the CMV is approaching a regular fixed weigh station, or a temporary or portable weigh station, or other pertinent service or inspection facility, and the CMV needs to stop or other corrective action is required, and if the one or more devices installed or present onboard the CMV include a pass/stop device, the pass/stop device may direct the CMV to enter into the weigh station or other pertinent service or inspection facility. If the CMV is approaching a regular fixed weigh station, or a temporary or portable weigh station, or other pertinent service or inspection facility, and the CMV does not need to stop, and if the one or more devices installed or present onboard the CMV include a pass/stop device, the pass/stop device may direct the CMV to pass by the weigh station or other pertinent service or inspection facility.

The one or more devices installed or present onboard the CMV may provide notification to the driver by way of directions or a form of warning such as an indicator or message. Notification to the driver may precede any action such as placing the CMV out of service or in a limp-home mode, or may occur in conjunction with or following the action such as placing the CMV out of service or in a limp-home mode. Furthermore, if the driver or operator fails to stop or follow directions, the one or more devices installed or present onboard the CMV may communicate the driver or operator's information to the remote site or company web service, or web service of the weigh station or other service or inspection facility, which information may be logged and passed along to local authorities. In this way, the local authorities may decide if the vehicle needs to be pulled over, or if further action needs to be taken. If multiple infractions occur, or other situations arise which require it, an embodiment of the system and method may only then take the step of directing the CMV to a regular fixed weigh station or other service or inspection facility for inspection, or putting the CMV out of service or in a limp-home mode.

Communication of information by way of wireless communications from the CMV to the remote site or company web service may occur directly by way of one or more telematics devices installed onboard the vehicle, and/or by way of a cellular or satellite network, which may be interconnected with the internet. Similarly, communication of information by way of wireless communications from the CMV to the remote site or company web service may occur by way of a one or more handheld devices present onboard the vehicle, such as a smart phone or similar device. In such an embodiment, the one or more handheld devices may relay information to and/or from the one or more telematics devices, the ECU, the EDL device, and/or the pass/stop device installed onboard the CMV, and/or to and/or from the remote site or company web service, and/or web service of the weigh station or other service or inspection facility. Part of the system and method may therefore take the form of a software program or application on the one or more telematics devices installed onboard the vehicle and/or on the handheld device. In these ways, the information wirelessly communicated by the CMV to and/or from the remote site or company web service, and/or web service of the weigh station or other service or inspection facility, may be so communicated from anywhere that has cellular or satellite coverage, without regard to the proximity of any fixed, portable, or temporary weigh station or other service or inspection facility.

Communication of information by way of wireless communications from the CMV to the remote site or company web service, or web service of the weigh station or other service or inspection facility, and/or from the remote site or company web service, or web service of the weigh station or other service or inspection facility, to the CMV may occur as a result of a remote prompt or interrogation, or "ping," by the remote site or company web service or web service of the weigh station or other service or inspection facility. Communication of information by way of wireless communications from the CMV to the remote site or company web service, or web service of the weigh station or other service or inspection facility, and/or from the remote site or company web service, or web service of the weigh station or other service or inspection facility, to the CMV may alternately occur as a result of a condition or characteristic of the CMV reaching or exceeding a predetermined threshold.

As a non-limiting example, an EDL software program or application installed on one or more devices, or a separate EDL device, installed onboard the CMV, or on a handheld device present onboard the CMV, may transmit to the remote site or company web service, or web service of the weigh station or other service or inspection facility, data about the driver and/or vehicle based on the driver's hours of service reaching or exceeding a certain threshold, in order to compel compliance with hours of service limitations. Failure to comply with hour of service limitations may result in the CMV being put out of service or put in limp-home mode, or may result in the information being logged and local authorities being notified, who may decide if the vehicle needs to be pulled over, or if further action needs to be taken. In another non-limiting example, a software program or application installed on one or more devices installed onboard the CMV, or on a handheld device present onboard the CMV, may transmit to the remote site or company web service, or web service of the weigh station or other service or inspection facility, data indicating that the CMV is no longer meeting emission standards, or is emitting a higher than acceptable level of pollutants. The driver may then be notified to proceed to a service or inspection facility for inspection and/or repair. As with the previous example, if the driver fails to proceed to a service or inspection facility for inspection and/or repair, the CMV may be put out of service or in limp-home mode, and/or the information may be logged and the pertinent authorities notified for further action.

Communication of information by way of wireless communications from the CMV to the remote site or company web service, or web service of the weigh station or other service or inspection facility, and/or from the remote site or company web service, or web service of the weigh station or other service or inspection facility, to the CMV may further occur at predetermined time intervals or at check points or boundaries. In a non-limiting example, an embodiment of the system and method may use a software program or application installed on the one or more devices installed onboard the CMV, and/or on the handheld device present onboard the CMV, to monitor and store J1939 or other vehicle CAN bus diagnostic information, and/or other sensed condition or characteristic of the CMV and/or driver. When a predetermined time interval passes, and/or when the CMV passes a predetermined check point or boundary, the information may be communicated by way of wireless communications to the remote site or company web service, and/or to the web service of the weigh station or other service or inspection facility.

In an embodiment of the system or method wherein communication of information by way of wireless communications from the CMV to the remote site or company web service, or web service of the weigh station or other service or inspection facility, and/or from the remote site or company web service, or web service of the weigh station or other service or inspection facility, to the CMV occurs at predetermined check points or boundaries, the predetermined check points or boundaries may or may not be associated with a fixed, temporary, or portable weigh station, or other service or inspection facility. Specifically, it is not necessary that the communication of information occur in the presence of a weigh station or other service or inspection facility. The one or more devices installed onboard the CMV and/or on the handheld device present onboard the CMV may store a database of weigh station or other service or inspection facility geo locations. When the CMV passes over a predetermined boundary, such as a radius boundary from a weigh station or other service or inspection facility, or a predetermined checkpoint, whether or not associated with or in the presence of a fixed, temporary, or portable weigh station, or other service or inspection facility, the information is communicated from the CMV to the remote site or company web service, or web service of the weigh station or other service or inspection facility.

If the system or method determines that the CMV should be directed to a weigh station or other service or inspection facility for inspection, repair, or other corrective action, the driver may be notified and/or the CMV may be directed to the weigh station or other service or inspection facility with which the predetermined boundary or checkpoint is associated, or to another weigh station or other service or inspection facility if the predetermined boundary or checkpoint is not associated with a certain weigh station or other service or inspection facility. If the CMV passes over a predetermined boundary, such as a radius boundary, or a predetermined checkpoint, that is in fact associated with or in the presence of a fixed, temporary, or portable weigh station, or other service or inspection facility, and if the one or more devices installed or present onboard the CMV include a pass/stop device, as before, the pass/stop device may direct the CMV to enter into or pass by the weigh station or other pertinent service or inspection facility, as appropriate.

Additionally, if the predetermined boundary or checkpoint is associated with a weigh station or other service or inspection facility, or if the system or method has determined that the CMV should be directed to a certain weigh station or other service or inspection facility, that weigh station or other service or inspection facility may be notified of the identification, permitting, credentials, and/or history of the driver or of the CMV, and/or any stored J1939 or other vehicle CAN bus diagnostic information, and/or other stored sensed condition or characteristic of the CMV or driver. Moreover, the stored J1939 or other vehicle CAN bus diagnostic information, and/or other stored sensed condition or characteristic of the CMV or driver, that is communicated from the CMV to the remote site or company web service, or web service of the weigh station or other service or inspection facility, may be a function of the location, area, predetermined boundary, or predetermined checkpoint, and/or the nature of the weigh station or other service or inspection facility with which the predetermined boundary or checkpoint is associated or to which the CMV is being directed.

The system and method may further utilize one or more algorithms within the software program or application installed on one or more devices installed onboard the CMV, and/or on the handheld device present onboard the CMV, and/or on the remote site or company web service or web service of the weigh station or other service or inspection facility, or on a combination thereof. The one or more algorithms may determine which information should be communicated from the CMV to the remote site or company web service or web service of the weigh station or other service or inspection facility, which diagnostic information and/or other stored sensed conditions or characteristics of the CMV or driver are of interest or concern, and what actions should be taken, in view of the upcoming road conditions, capacities, and/or facilities, and/or established safety data associated with the upcoming roadway. The one or more algorithms within the software program or application installed on one or more devices installed onboard the CMV, and/or on the handheld device present onboard the CMV, may be remotely programmable and/or re-programmable by the remote site or company web service, and/or by the web service of the weigh station or other service or inspection facility.

In an exemplary non-limiting example, if the CMV has received a remote prompt or interrogation, or if a condition or characteristic of the CMV has reached or exceeded a predetermined threshold, or if a predetermined time interval has expired, or a predetermined check point or boundary crossed, requiring communication of the stored diagnostic information and/or other stored sensed conditions or characteristics of the CMV or driver gathered since at least the previous transmission of information, the information may be initially analyzed using at least a portion of the one or more algorithms within the software program or application installed on one or more devices onboard the CMV and/or on the handheld device present onboard the CMV. The algorithm may determine which information should be communicated from the CMV to the remote site or company web service, and/or to the web service of the weigh station or other service or inspection facility, based on one or more outstanding value or measurement, one or more inter-correlation between the items of diagnostic information and/or other stored sensed conditions or characteristics of the CMV or driver, identified safety critical items, consequential probabilities, and/or history of infractions or non-compliance.

In this non-limiting exemplary embodiment, once the system or method communicates the stored diagnostic information and/or other stored sensed conditions or characteristics of the CMV or driver by way of wireless communications from the CMV to the remote site or company web service, and/or to the web service of the weigh station or other service or inspection facility, the remote site or company web service, and/or the web service of the weigh station or other service or inspection facility, may then implement at least a portion of the one or more algorithms to analyze any outstanding value or measurement, safety critical item, inter-correlation between the items of diagnostic information and/or other stored sensed conditions or characteristics of the CMV or driver, and/or history of infractions or non-compliance, further in view of the upcoming road conditions, capacities, and/or facilities, and/or established safety data associated with the upcoming roadway. The algorithm may first determine if any identified safety critical item will allow the CMV to proceed to a weigh station or other service or inspection facility, or if the CMV should be put out of service or put into a limp-home mode. If necessary, the system and method may then communicate to the driver the specific error code information that has been reported, and may provide additional information regarding how soon and in what way the vehicle requires repair or adjustment. The system and method may further notify appropriate authorities, so that the authorities are aware of the presence of a potentially out-of-compliance vehicle on the road, and are able to take appropriate next steps.

The algorithm may then identify any concerning inter-correlation between the items of diagnostic information and/or other stored sensed conditions or characteristics of the CMV or driver, and/or history of infractions or non-compliance, and upcoming road conditions, capacities, and/or facilities, and/or established safety data associated with the upcoming roadway. A concerning inter-correlation may be further be based on one or more probability functions. For non-limiting example, if a CMV has minimally exceeded its interval between necessary brake inspections, but the upcoming roadway is largely flat and level, and weather conditions are clear, and the CMV is lightly loaded, and the driver has a clean driving history, a regular route, and a history of compliance, the algorithm may then direct the system or method to simply notify the driver and/or direct the CMV to a regular fixed weigh station or other service or inspection facility for inspection, based on a calculated low probability of incident. However, if the CMV has exceeded its interval between necessary brake inspections, and the upcoming roadway is hilly or weather conditions have produced low visibility, and/or the CMV is heavily loaded, and/or the driver has a history of infractions (for example speeding or accidents), non-compliance, and/or route variation, which results in an increased probability of incident, the algorithm of the system or method may put the CMV in limp-home mode or disable one or more vehicle functions, or even put the CMV out of service entirely.

In this way, the system or method takes into account inter-correlations between the diagnostic information and/or conditions or characteristics of the CMV or driver, and upcoming road conditions, capacities, facilities, and/or established safety data in determining an appropriate action to be taken. As a result, the use of an algorithm to determine the appropriate action to be taken, or to assist authorities in determining the appropriate action to be taken, can reduce or eliminate the amount of time that a driver or CMV spends at a weigh station inspections. Also, since the algorithm has access to more data than previously available at weigh stations, over a longer span of time, the algorithm is able to make a more accurate and detailed assessment of the state of the vehicle and its driver, and the safety of proceeding given upcoming road conditions, capacities, and/or facilities, and/or established safety data. The system and method may therefore more safely and appropriately decide what items need to be addressed, and whether to direct the driver of the CMV to bypass a regular fixed weigh station, require the driver of the CMV to proceed to a regular fixed weigh station or other service or inspection facility for inspection and/or repair, place the CMV in limp-home mode, disable one or more vehicle functions, or put the CMV out of service entirely.

In this way, the system and method may eliminate the use of back roads to avoid weigh stations. The system and method further satisfies the requirement for having an electronic logging device on the truck which logs the hours of service of the driver. The system and method may eliminate the need for physical structures to be built on the side of roads or in roads in order to weigh and/or inspect and/or confirm safety of vehicles. It will also address several issues in the weigh station process and introduce new processes to make the inspection process faster, increase the safety to the driver of the truck and the passenger car drivers sharing the road and also reduce the negative impact of CMV's on the environment.

Referring now to FIG. 1, a schematic view of a vehicle 10 is shown having an embodiment of a system 12 for determining the weight and/or other condition or characteristic of the vehicle 10 using one or more devices 16 installed or present on the vehicle 10, wirelessly communicating the vehicle weight and/or other vehicle condition or characteristic in response to a remote prompt and/or predetermined threshold, and correlating to and/or taking action based upon the vehicle weight and/or other vehicle condition or characteristic information, and further based upon upcoming road conditions, capacities, and/or facilities. The one or more devices 16 may include a telematics device 18, an Engine Control Unit (ECU) 20, a handheld device 22, an Electronic Driver Logging (EDL) device 32, and/or a pass/stop device 24. The telematics device 18, the ECU 20, the EDL device 32, and/or the pass/stop device 24 may be interconnected by direct connections, by way of a vehicle controller area network (CAN), and/or wirelessly. Similarly, the handheld device 22 may be interconnected with the telematics device 18, with the ECU 20, with the EDL device 32, and/or with the pass/stop device 24 by way of direct connection and/or wirelessly.

The one or more devices 16 may be configured to sense and/or determine weight and/or other conditions or characteristics of the vehicle 10, directly or indirectly using various sensors (not shown). The telematics device 18, the handheld device 22, the EDL device 32, and/or the pass/stop device 24 are configured, by way of one or more software programs or applications 28 installed thereupon, to communicate with a remote site or company web service 40, and/or with a weigh station or other service or inspection facility site or web service 42, by way of wireless communication device 14. Using wireless communication device 14, the telematics device 18, the handheld device 22, the EDL device 32, and/or the pass/stop device 24 may be configured to communicate directly with the remote site or company web service 40 and/or directly with the weigh station or other service or inspection facility site or web service 42, or may be configured to communicate with the remote site or company web service 40 and/or with the weigh station or other service or inspection facility site or web service 42 by way of cellular network 36 and/or satellite network 38. As noted previously, the information that the telematics device 18, the handheld device 22, the EDL device 32, and/or the pass/stop device 24 may be configured to communicate may include at least one of overall vehicle weight, individual axle weight, tire pressure, vehicle identification, vehicle status, vehicle and/or driver permit information, driver credentials, driver history, driver hours of service, driver intoxication, quantity of fuel, quantity of reductant, brake air pressure, quantity of brake fluid, brake system function and/or record of inspection and/or adjustment, J1939 or other vehicle controller area network (CAN) bus diagnostic information, engine and/or transmission faults, exhaust particulate and/or pollutant level, vehicle height, vehicle width, and vehicle length, as non-limiting examples.

The remote site or company web service 40 and/or the weigh station or other service or inspection facility site or web service 42 may then be configured to correlate and/or compare the information communicated to the remote site or company web service 40, and/or to the weigh station or other service or inspection facility site or web service 42, by the telematics device 18, the handheld device 22, the EDL device 32, and/or the pass/stop device 24 with upcoming road conditions, capacities, and/or facilities, and/or established safety data associated with the upcoming roadway. As noted previously, such upcoming road conditions, capacities, and/or facilities, and/or established safety data may include the weight bearing capacity of the roadway or roadway structures ahead, upcoming slopes, grades, or other terrain, weather conditions, and/or dimensional limitations imposed by normal roadway constraints or by construction, as non-limiting examples. The remote site or company web service 40 and/or the weigh station or other service or inspection facility site or web service 42 may be configured to then determine whether the vehicle 10 requires corrective action, and/or needs to stop or be stopped due to one or more incompatibilities or conflicts between the information communicated and the upcoming road conditions, capacities, and/or facilities, and/or established safety data associated with the upcoming roadway satisfying a predetermined criteria requiring such a stop.

The remote site or company web service 40, and/or the weigh station or other service or inspection facility site or web service 42, may be configured to then communicate the determination that corrective action needs to be taken, or that the vehicle needs to stop or be stopped, to at least one of the telematics device 18, the handheld device 22, the EDL device 32, and/or the pass/stop device 24 of the one or more devices 16 directly by way of wireless communications device 14, or by way of cellular network 36 and/or satellite network 38 and wireless communications device 14. The pass/stop device 24 installed onboard the vehicle 10, the handheld device 22 present onboard the vehicle 10, and/or an indicator or message device 26 connected to one of the telematics device 18, the EDL device 32, and/or wirelessly to the handheld device 22, may be configured to then provide notification to the driver and/or direct the vehicle to a weigh station or other service or inspection facility for inspection, or to enter or pass by a nearby weigh station or other service or inspection facility, if present, according to the determination. Further, the telematics device 18, the EDL device 32, and/or the pass/stop device 24 of the one or more devices 16 may be configured to put the vehicle 10 out of service or in a limp-home mode, or to disable one or more vehicle functions, or to allow the vehicle 10 to proceed on its route, according to the determination. Additionally, if the driver or operator fails to take corrective action, stop, or follow directions, as appropriate, the telematics device 18, the handheld device 22, the EDL device 32, and/or the pass/stop device 24 of the one or more devices 16 may further be configured to communicate the driver or operator's information to the remote site or company web service 40 and/or weigh station or other service or inspection facility site or web service 42. The remote site or company web service 40 and/or weigh station or other service or inspection facility site or web service 42 may be configured to then log this information and notify the authorities.

The telematics device 18, the handheld device 22, the EDL device 32, and/or the pass/stop device 24 may further be configured, by way of the one or more software programs or applications 28 installed thereupon, to communicate with the remote site or company web service 40, and/or with the weigh station or other service or inspection facility site or web service 42, as a result of a remote prompt or interrogation, or "ping" by the remote site or company web service 40, or by the web service of the weigh station or other service or inspection facility 42, or as a result of a condition or characteristic of the vehicle 10 and/or of the driver of the vehicle 10 reaching or exceeding a predetermined threshold, such as logged driver hours or vehicle emission levels. The handheld device 22 and/or the EDL device 32 may therefore be provided with an Electronic Driver Logging program or application. The telematics device 18, the handheld device 22, the EDL device 32, and/or the pass/stop device 24 may further be configured, by way of the one or more software programs or applications 28 installed thereupon, to communicate with the remote site or company web service 40, and/or with the weigh station or other service or inspection facility site or web service 42, at predetermined time intervals, or at predetermined check points or boundaries.

One or more of the telematics device 18, the handheld device 22, the EDL device 32, and/or the pass/stop device 24 may further be configured with a database 30 of weigh station and/or service or inspection facility locations, and may further be configured, by way of the one or more software programs or applications 28 installed thereupon, and by way of the handheld device 22 present onboard the vehicle 10 and/or the indicator or message device 26, to direct the driver of the vehicle 10 to the weigh station or other service or inspection facility with which the predetermined boundary or checkpoint is associated, or to another weigh station or other service or inspection facility if the predetermined boundary or checkpoint is not associated with a certain weigh station or other service or inspection facility. The pass/stop device 24 may further be configured to direct the vehicle 10 to enter into or pass by a weigh station or other pertinent service or inspection facility, as appropriate, if the predetermined boundary or checkpoint is in fact associated with or in the presence of a weigh station or other service or inspection facility. The telematics device 18, the handheld device 22, the EDL device 32, and/or the pass/stop device 24 may further be configured to notify the remote site or company web service 40, and/or the weigh station or other service or inspection facility site or web service 42, of the identification, permitting, credentials, and/or history of the driver or of the vehicle 10, and/or any stored sensed condition or characteristic of the vehicle 10 or driver, as a function of the location, area, predetermined boundary, or predetermined checkpoint, and/or the nature of the weigh station or other service or inspection facility with which the predetermined boundary or checkpoint is associated or to which the vehicle 10 is being directed.

The system 12 may further be provided with one or more algorithms within the software program or application 28 installed on one or more devices 16 installed or present onboard the vehicle 10, and/or on the remote site or company web service 40 or weigh station or other service or inspection facility site or web service 42, or on a combination thereof. The one or more algorithms may be configured to determine which information should be communicated from the vehicle 10 based on outstanding or concerning values or measurements or inter-correlations between values or measurements, and/or which diagnostic information and/or other stored sensed conditions or characteristics of the vehicle 10 or driver are of interest or concern based on inter-correlations, identified safety critical items, consequential severities, and historical patterns. The one or more algorithms may be further configured to determine what actions should be taken based on one or more probability functions, and/or in view of the upcoming road conditions, capacities, and/or facilities, and/or established safety data associated with the upcoming roadway. The one or more algorithms may be remotely programmable and/or re-programmable by the remote site or company web service 40 or weigh station or other service or inspection facility site or web service 42.

Figure 2:
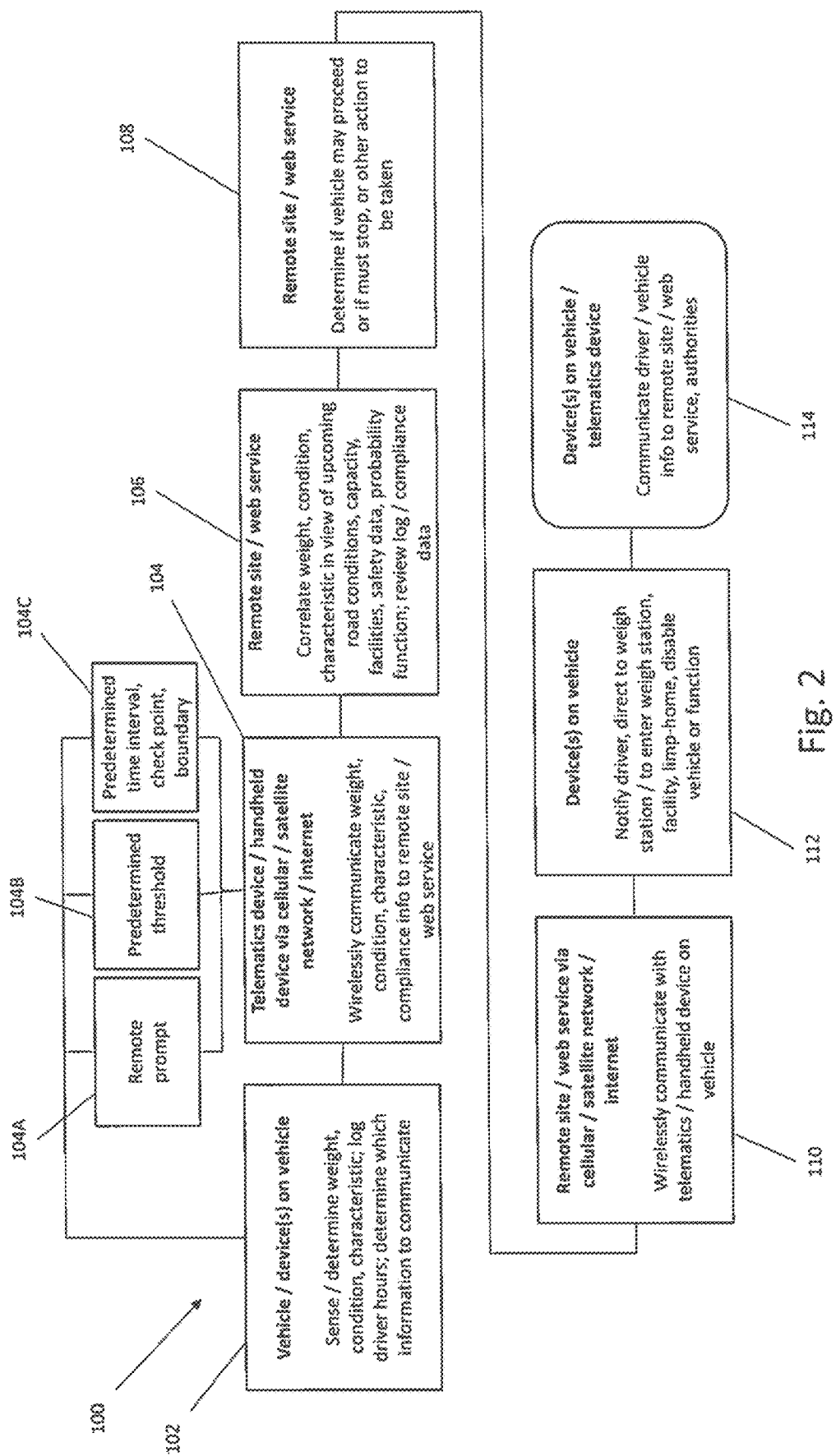
FIG. 2 is a flowchart diagram of an embodiment of a system and method for determining the weight and/or other condition or characteristic of a vehicle using one or more devices on the vehicle, wirelessly communicating the vehicle weight and/or other vehicle condition or characteristic in response to a remote prompt and/or predetermined threshold, and correlating to and/or taking action based upon the vehicle weight and/or other vehicle condition or characteristic information, and further based upon upcoming road conditions, capacities, and/or facilities, as described herein.

Turning now to FIG. 2, a flowchart diagram of an embodiment of the system and method for determining the weight and/or other condition or characteristic of a vehicle using one or more devices on the vehicle, wirelessly communicating the vehicle weight and/or other vehicle condition or characteristic in response to a remote prompt and/or predetermined threshold, and correlating to and/or taking action based upon the vehicle weight and/or other vehicle condition or characteristic information, and further based upon upcoming road conditions, capacities, and/or facilities is shown. One or more devices 16 installed or present on a vehicle 10, in cooperation with a remote site or company web service 40, and/or with a weigh station or other service or inspection facility site or web service 42 (not shown in FIG. 2), are configured to take several process steps 100 starting at first step 102.

In first step 102, the one or more devices 16, which may include a telematics device 18, an ECU 20, a handheld device 22, an EDL device 32, and/or a pass/stop device 24 (not shown in FIG. 2), sense and/or determine one or more conditions or characteristics of the vehicle 10 and/or of its driver, directly or indirectly using various sensors. The one or more conditions of the vehicle 10 and/or of its driver may include at least one of overall vehicle weight, individual axle weight, tire pressure, vehicle identification, vehicle status, vehicle and/or driver permit information, driver credentials, driver history, driver hours of service, driver intoxication, quantity of fuel, quantity of reductant, brake air pressure, quantity of brake fluid, brake system function and/or record of inspection and/or adjustment, J1939 or other vehicle controller area network (CAN) bus diagnostic information, engine and/or transmission faults, exhaust particulate and/or pollutant level, vehicle height, vehicle width, and vehicle length, as non-limiting examples. The one or more devices 16, using one or more algorithms at least partially contained within a software program or application 28 (not shown in FIG. 2) installed thereupon, determine which information should be communicated from the vehicle 10 based on outstanding or concerning values or measurements, or inter-correlations between values or measurements.

In a second step 104 of the process 100, at least one of the telematics device 18, the handheld device 22, the EDL device 32, and/or the pass/stop device 24, communicates the one or more conditions of the vehicle 10 and/or of its driver with the remote site or company web service 40, and/or with the weigh station or other service or inspection facility site or web service 42, directly by way of a wireless communication device 14 (not shown in FIG. 2), or by way of cellular network 36 and/or satellite network 38 (not shown in FIG. 2) using the wireless communications device 14. Communication of the one or more conditions of the vehicle 10 and/or of its driver by the telematics device 18, the handheld device 22, the EDL device 32, and/or the pass/stop device 24 with the remote site or company web service 40, and/or with the weigh station or other service or inspection facility site or web service 42, may occur in sub-step 104A as a result of a remote prompt or interrogation, or "ping" by the remote site or company web service 40, or by the web service of the weigh station or other service or inspection facility 42. Alternately, communication of the one or more conditions of the vehicle 10 and/or of its driver by the telematics device 18, the handheld device 22, the EDL device 32, and/or the pass/stop device 24 with the remote site or company web service 40, and/or with the weigh station or other service or inspection facility site or web service 42, may occur in sub-step 104B as a result of a condition or characteristic of the vehicle 10 and/or of the driver of the vehicle 10 reaching or exceeding a predetermined threshold, such as logged driver hours or vehicle emission levels. Alternately, communication of the one or more conditions of the vehicle 10 and/or of its driver by the telematics device 18, the handheld device 22, the EDL device 32, and/or the pass/stop device 24 with the remote site or company web service 40, and/or with the weigh station or other service or inspection facility site or web service 42, may occur in sub-step 104C as a result of the passage of a predetermined time interval, or at a predetermined check point or boundary.

In a third step 106 of the process 100, the remote site or company web service 40, and/or the weigh station or other service or inspection facility site or web service 42, using the one or more algorithms at least partially contained within the software program or application 28 (not shown in FIG. 2) installed therein, correlate and/or compare the information communicated to the remote site or company web service 40, and/or to the weigh station or other service or inspection facility site or web service 42, by the telematics device 18, the handheld device 22, the EDL device 32, and/or the pass/stop device 24, with upcoming road conditions, capacities, and/or facilities, and/or established safety data associated with the upcoming roadway. As noted previously, such upcoming road conditions, capacities, and/or facilities, and/or established safety data may include the weight bearing capacity of the roadway or roadway structures ahead, upcoming slopes, grades, or other terrain, weather conditions, and/or dimensional limitations imposed by normal roadway constraints or by construction, as non-limiting examples. In the third step 106, the remote site or company web service 40, and/or the weigh station or other service or inspection facility site or web service 42, using the one or more algorithms at least partially contained within the software program or application 28 installed therein, may further determine which diagnostic information and/or other stored sensed conditions or characteristics of the vehicle 10 or driver are of interest or concern based on one or more inter-correlation, identified safety critical item, consequential severity, historical pattern, and/or probability function.

In a fourth step 108 of the process 100, the remote site or company web service 40, and/or the weigh station or other service or inspection facility site or web service 42, using the one or more algorithms at least partially contained within the software program or application 28 installed therein, determines whether the vehicle 10 requires corrective action, and/or needs to stop or be stopped, or if other action needs to be taken, due to one or more incompatibilities or conflicts between the information communicated and the upcoming road conditions, capacities, and/or facilities, and/or established safety data associated with the upcoming roadway, which one or more incompatibilities or conflicts may be evaluated to determine if they satisfy at least one predetermined criteria. The one or more algorithms may be further configured to determine what actions should be taken based on one or more probability functions. In a fifth step 110 of the process 100, the remote site or company web service 40, and/or the weigh station or other service or inspection facility site or web service 42, then communicates this determination to at least one of the telematics device 18, the handheld device 22, the EDL device 32, and/or the pass/stop device 24 of the one or more devices 16, directly by way of wireless communications device 14, or by way of cellular network 36 and/or satellite network 38 and wireless communications device 14.

In a sixth step 112 of the process 100, the pass/stop device 24 installed onboard the vehicle 10, the handheld device 22 present onboard the vehicle 10, and/or an indicator or message device 26 connected to one of the telematics device 18, the EDL device 32, and/or wirelessly to the handheld device 22, may notify the driver of a needed corrective action and/or direct the vehicle to a weigh station or other service or inspection facility for inspection, or to enter or pass by a nearby weigh station or other service or inspection facility, if present, depending upon the determination of the remote site or company web service 40, and/or of the weigh station or other service or inspection facility site or web service 42. Further, the telematics device 18, the EDL device 32, and/or the pass/stop device 24 of the one or more devices 16 may put the vehicle 10 out of service or in a limp-home mode, or may disable one or more vehicle functions, or may allow the vehicle 10 to proceed on its route, according to the determination of the remote site or company web service 40, and/or of the weigh station or other service or inspection facility site or web service 42.

The sixth step 112 may further include directing the driver of the vehicle 10 to the weigh station or other service or inspection facility with which a predetermined boundary or checkpoint of sub-step 104C is associated, or to another weigh station or other service or inspection facility if the predetermined boundary or checkpoint of sub-step 104C is not associated with a certain weigh station or other service or inspection facility, using the one or more software programs or applications 28, and/or a database 30 of weigh station and/or service or inspection facility locations, installed on one or more of the telematics device 18, the handheld device 22, the EDL device 32, and/or the pass/stop device 24. Driver directions may be delivered using the handheld device 22 present onboard the vehicle 10 and/or the indicator or message device 26. If the predetermined boundary or checkpoint of sub-step 104C is in fact associated with or in the presence of a weigh station or other service or inspection facility, the sixth step 112 may direct the vehicle 10 to enter into or pass by a weigh station or other pertinent service or inspection facility, as appropriate, using the pass/stop device 24.

In an optional seventh step 114 of the process, the telematics device 18, the handheld device 22, the EDL device 32, and/or the pass/stop device 24 may notify a remote site or company web service 40, and/or a weigh station or other service or inspection facility site or web service 42, of the identification, permitting, credentials, and/or history of the driver or of the vehicle 10, and/or any stored sensed condition or characteristic of the vehicle 10 or driver, as a function of the location, area, predetermined boundary, or predetermined checkpoint, and/or the nature of the weigh station or other service or inspection facility with which the predetermined boundary or checkpoint is associated or to which the vehicle 10 is being directed. Additionally, if the driver or operator fails to take corrective actions, stop, or follow directions, the telematics device 18, the handheld device 22, the EDL device 32, and/or the pass/stop device 24 may communicate the driver or operator's information to the remote site or company web service 40, and/or weigh station or other service or inspection facility site or web service 42, which may then log this information and notify the authorities.

While the system and method for determining the weight and/or other condition or characteristic of a vehicle using one or more devices on the vehicle, wirelessly communicating the vehicle weight and/or other vehicle condition or characteristic in response to a remote prompt and/or predetermined threshold, and correlating to and/or taking action based upon the vehicle weight and/or other vehicle condition or characteristic information, and further based upon upcoming road conditions, capacities, and/or facilities has been described with respect to at least one embodiment, the system and method can be further modified within the spirit and scope of this disclosure. This application is therefore intended to cover any variations, uses, or adaptations of the system and method using its general principles. Further, this application is intended to cover such departures from the present disclosure as come within known or customary practice in the art to which the disclosure pertains and which fall within the limits of the appended claims.

| REFERENCE NUMBER LISTING | |
|---|---|
| 10 | Vehicle |
| 12 | System |
| 14 | Wireless communication device |
| 16 | Device installed or present on CMV |
| 18 | Telematics device |
| 20 | Engine Control Unit (ECU) |
| 22 | Handheld device |
| 24 | Pass/stop device |
| 26 | Indicator or message device |
| 28 | Software program or application |

-continued

| REFERENCE NUMBER LISTING | |
|---|---|
| 30 | Database of weigh station/service or inspection facility locations |
| 32 | Electronic Driver Logging device |
| 34 | Electronic Driver Logging program or application |
| 36 | Cellular network |
| 38 | Satellite network |
| 40 | Remote site or company web service |
| 42 | Weigh station or other service or inspection facility site or web service |
| 100 | Method |
| 102 | First step |
| 104 | Second Step |
| 104A | Sub-step |
| 104B | Sub-step |
| 104C | Sub-step |
| 106 | Third step |
| 108 | Fourth step |
| 110 | Fifth Step |
| 112 | Sixth Step |
| 114 | Seventh Step |

What is claimed is:

1. A system for use with a vehicle with a controller area network (CAN) bus and having a payload when on a roadway, the system comprising:
at least one device installed or present onboard the vehicle and configured to sense or determine at least a weight of the vehicle and transmit data representative thereof, wherein the at least one device installed or present onboard the vehicle comprises sensors;
a programmable electronic device having a wireless communication capability and communicatively coupled through the CAN bus to the at least one device installed or present onboard the vehicle;
the CAN bus configured to receive the data representative of at least the weight of the vehicle and transmit the data through a wireless communication device to a web service associated with a predetermined check point or boundary related to an upcoming segment of the roadway;
the wireless communication device being configured to receive the data representative of at least the weight of the vehicle and wirelessly transmit the data to the web service as a function of a location of the vehicle to the predetermined check point or boundary;
the web service having stored data pertaining to vehicle safety requirements for the upcoming segment of the roadway;
the web service being configured to correlate or compare the data representative of at least the weight of the vehicle with the stored data pertaining to vehicle safety, and to send a signal to the vehicle through the programmable electronic device upon determining that there is at least one incompatibility or conflict between the data representative of at least the weight of the vehicle and the stored data pertaining to vehicle safety requirement for the upcoming segment of the roadway requiring corrective action; and
the programmable electronic device being configured to notify the vehicle by an indication to enter the upcoming segment of the roadway or an indication to take the corrective action.

2. The system of claim 1, wherein:
the web service being further configured to determine whether the at least one incompatibility or conflict between the data representative of at least the weight of the vehicle and the stored data pertaining to vehicle safety satisfies at least one predetermined criteria requiring the vehicle to take the corrective action before entering the upcoming segment of the roadway; and
the web service being further configured to communicate to the vehicle through the wireless communication device, data for facilitating the corrective action to be performed on the vehicle.

3. The system of claim 2, further comprising:
at least one algorithm within at least one software program or application, said at least one algorithm residing at least partially within at least one of the at least one device installed or present onboard the vehicle and the web service;
the at least one algorithm being configured to at least one of:
determine which conditions or characteristics of the vehicle or its driver should be communicated based on at least one outstanding or concerning value or measurement or inter-correlation between values or measurements;
determine which conditions or characteristics of the vehicle or driver are of interest or concern based on at least one of their value, inter-correlations, identified safety critical items, consequential severities, and historical patterns; and
determine what action should be taken based on a probability function and at least one of upcoming road conditions, upcoming road capacity, upcoming road facility, and established safety data associated with the upcoming segment of the roadway.

4. The system of claim 3, wherein:
the at least one algorithm is remotely programmable by the web service and;
the programmable electronic device is a separate device from the wireless communication device.

5. The system of claim 1, wherein:
the at least one device installed or present onboard the vehicle and the programmable electronic device collectively comprise at least one of a vehicle telematics device, an Engine Control Unit (ECU), an Electronic Driver Logging (EDL) device, a handheld device, and an indicator or message device.

6. The system of claim 5, wherein:
the wireless communications device being further configured to at least one of:
provide notification to a driver of the vehicle;
direct the vehicle to a weigh station or other service or inspection facility for inspection;
put the vehicle out of service or in a limp-home mode;
disable one or more vehicle functions; and
allow the vehicle to proceed to enter the upcoming segment of the roadway;
according to the determination of whether the vehicle requires corrective action.

7. The system of claim 1, wherein:
the at least one device installed or present onboard the vehicle being configured to communicate at least one condition or characteristic of the vehicle or its driver with the web service, at least one of:
as a result of a remote prompt or interrogation by the web service;
as a result of the at least one condition or characteristic of the vehicle or its driver reaching or exceeding a predetermined threshold;
at a predetermined time interval;

at the predetermined check point or boundary; and
as a result of the driver failing to stop or follow directions.

8. The system of claim 7, wherein:
the at least one device installed or present onboard the vehicle being further configured to notify the web service of at least one of:
an identification, permitting, credentials, or history of a driver of the vehicle;
an identification, permitting, or history of the vehicle; and
a condition or characteristic of the vehicle or the driver,
as a function of at least one of vehicle location, vehicle area, the predetermined boundary or check point, and nature of a weigh station or other facility with which the predetermined boundary or check point is associated or to which the vehicle is being directed.

9. The system of claim 1, wherein:
the data representative, which is sensed or determined by the at least one sensor installed or present onboard the vehicle, includes at least one of overall vehicle weight, individual axle weight, tire pressure, vehicle identification, vehicle status, vehicle permit information, driver permit information, driver credentials, driver history, driver hours of service, driver intoxication, quantity of fuel, quantity of reductant, brake air pressure, quantity of brake fluid, brake system function, record of brake system inspection or adjustment, vehicle controller area network (CAN) bus diagnostic information, engine faults, transmission faults, exhaust particulate or pollutant level, vehicle height, vehicle width, and vehicle length; and
the stored data pertaining to vehicle safety requirement for the upcoming segment of the roadway includes at least one of road condition, capacity, facility, or established safety data associated with the upcoming segment of the roadway including at least one of bearing capacity of the roadway or roadway structures ahead, upcoming slopes, upcoming grades, upcoming terrain, weather conditions, and dimensional limitations.

10. A system for alerting a vehicle driver of a potential safety issue with travelling on an upcoming roadway based on conditions or characteristics of the vehicle or its driver, in view of stored data representative of conditions or characteristics associated with the upcoming roadway, comprising:
at least one wireless communication device installed or present on the vehicle;
at least one sensor device that is installed or present onboard the vehicle configured to sense or determine at least one condition or characteristic of the vehicle or its driver and to transmit data representative of the at least one condition or characteristic of the vehicle or its driver to the at least one wireless communication device installed or present on the vehicle;
at least one remote site or web service;
a programmable electronic device in communication over a controller area network (CAN) bus with the at least one sensor device, wherein the programmable electronic device is configured to:
wirelessly communicate the data representative of the at least one condition or characteristic of the vehicle or its driver from the at least one sensor device installed or present onboard the vehicle to the at least one remote site or web service;
store data representative of safety conditions associated with the upcoming roadway;
correlate or compare the data representative of at least one condition or characteristic of the vehicle or its driver with the stored data representative of safety data representative of safety conditions associated with the upcoming roadway;
determine if the data representative of the at least one condition or characteristic of the vehicle or its driver satisfies predetermined safety criteria associated with comparing the safety data representative of safety conditions associated with the upcoming roadway with the data representative of at least one condition or characteristic of the vehicle or its driver; and
upon determining that the data representative of the at least one condition or characteristic of the vehicle or its driver fails to satisfy the predetermined safety criteria, send a signal to the vehicle indicating a potential safety condition with proceeding to travel on the upcoming roadway.

11. The system of claim 10, wherein the signal sent to the vehicle indicating a potential safety condition with proceeding to travel on the upcoming roadway is capable of one of disabling the vehicle, allowing the vehicle to operate on the upcoming roadway only in limp-home capacity, and providing an alternative route which satisfies all predetermined safety criteria, wherein the programmable electronic device is configured to:
determine whether the at least one incompatibility or conflict between the at least one condition or characteristic of the vehicle or its driver and the road condition, capacity, facility, or established safety data associated with the upcoming roadway satisfies at least one predetermined criteria requiring the vehicle to stop or enter a weigh station; and
communicate the determination of whether the vehicle needs to stop or enter the weigh station to the at least one remote site or web service.

12. The system of claim 10, wherein:
the data representative, which is sensed or determined by the at least one sensor device installed or present onboard the vehicle, includes at least one of overall vehicle weight, individual axle weight, tire pressure, vehicle identification, vehicle status, vehicle permit information, driver permit information, driver credentials, driver history, driver hours of service, driver intoxication, quantity of fuel, quantity of reductant, brake air pressure, quantity of brake fluid, brake system function, record of brake system inspection or adjustment, vehicle controller area network (CAN) bus diagnostic information, engine faults, transmission faults, exhaust particulate or pollutant level, vehicle height, vehicle width, and vehicle length; and
the stored data representative of safety conditions associated with the upcoming segment of the roadway includes at least one of road condition, capacity, facility, or established safety data associated with the upcoming segment of the roadway including at least one of bearing capacity of the roadway or roadway structures ahead, upcoming slopes, upcoming grades, upcoming terrain, weather conditions, and dimensional limitations.

13. An edge computing system for use with a vehicle with a controller area network (CAN) bus and having a payload when on a roadway, the system comprising:
at least one sensor installed or present onboard the vehicle and configured to sense or determine at least a weight of the vehicle and transmit data representative thereof;

the controller area network (CAN) bus communicatively coupling the at least one sensor installed or present onboard the vehicle to a programmable electronic device with a wireless communication capability;

an interface to a remote web service associated with a predetermined check point or boundary related to an upcoming segment of the roadway;

a wireless communication device configured to receive the data representative of at least the weight of the vehicle and transmit the data to the remote web service as a function of a location of the vehicle to the predetermined check point or boundary;

the programmable electronic device configured to:
- store data pertaining to vehicle safety requirements for the upcoming segment of the roadway;
- correlate or compare the data representative of at least the weight of the vehicle with the stored data pertaining to vehicle safety;
- determine that there is at least one incompatibility or conflict between the data representative of at least the weight of the vehicle and the stored data pertaining to vehicle safety requirement for the upcoming segment of the roadway satisfies at least one predetermined criteria requiring the vehicle to take the corrective action before entering the upcoming segment of the roadway;
- notify the vehicle by an indication to enter the upcoming segment of the roadway or by an indication related to the corrective action to be performed on or for the vehicle; and
- cause the wireless communication device to wirelessly communicate the indication related to the corrective action to the remote web service.

14. The edge computing system of claim 13, wherein the programmable electronic device is configured to at least one of:
- determine which conditions or characteristics of the vehicle or its driver should be communicated based on at least one outstanding or concerning value or measurement or inter-correlation between values or measurements;
- determine which conditions or characteristics of the vehicle or driver are of interest or concern based on at least one of their value, inter-correlations, identified safety critical items, consequential severities, and historical patterns; and
- determine what action should be taken based on a probability function and at least one of upcoming road conditions, upcoming road capacity, upcoming road facility, and established safety data associated with the upcoming segment of the roadway.

15. The edge computing system of claim 13, wherein the programmable electronic device is remotely programmable by the remote web service, and the programmable electronic device is a separate device from the wireless communication device.

16. The edge computing system of claim 13, wherein the at least one sensor installed or present onboard the vehicle and the programmable electronic device collectively comprise at least one of a vehicle telematics device, an Engine Control Unit (ECU), an Electronic Driver Logging (EDL) device, a handheld device, and an indicator or message device.

17. The edge computing system of claim 13, wherein the programmable electronic device is configured to at least one of:
- provide notification to a driver of the vehicle;
- direct the vehicle to a weigh station or other service or inspection facility for inspection;
- put the vehicle out of service or in a limp-home mode;
- disable one or more vehicle functions; and
- allow the vehicle to proceed to enter the upcoming segment of the roadway;

according to the determination of whether the vehicle requires corrective action.

18. The edge computing system of claim 13, wherein the programmable electronic device is configured to cause the wireless communication device to wirelessly communicate at least one condition or characteristic of the vehicle or its driver with the remote web service, at least one of:
- as a result of a remote prompt or interrogation by the remote web service;
- as a result of the at least one condition or characteristic of the vehicle or its driver reaching or exceeding a predetermined threshold;
- at a predetermined time interval;
- at the predetermined check point or boundary; and
- as a result of the driver failing to stop or follow directions.

19. The edge computing system of claim 18, wherein the programmable electronic device is configured to cause the wireless communication device to wirelessly notify the remote web service of at least one of:
- an identification, permitting, credentials, or history of a driver of the vehicle;
- an identification, permitting, or history of the vehicle; and
- a condition or characteristic of the vehicle or the driver, as a function of at least one of vehicle location, vehicle area, the predetermined boundary or check point, and nature of a weigh station or other facility with which the predetermined boundary or check point is associated or to which the vehicle is being directed.

20. The edge computing system of claim 13, wherein:
- the data representative, which is sensed or determined by the at least one sensor installed or present onboard the vehicle, includes at least one of overall vehicle weight, individual axle weight, tire pressure, vehicle identification, vehicle status, vehicle permit information, driver permit information, driver credentials, driver history, driver hours of service, driver intoxication, quantity of fuel, quantity of reductant, brake air pressure, quantity of brake fluid, brake system function, record of brake system inspection or adjustment, vehicle controller area network (CAN) bus diagnostic information, engine faults, transmission faults, exhaust particulate or pollutant level, vehicle height, vehicle width, and vehicle length; and
- the stored data pertaining to vehicle safety requirement for the upcoming segment of the roadway includes at least one of road condition, capacity, facility, or established safety data associated with the upcoming segment of the roadway including at least one of bearing capacity of the roadway or roadway structures ahead, upcoming slopes, upcoming grades, upcoming terrain, weather conditions, and dimensional limitations.

* * * * *